US012669823B2

(12) United States Patent
Yang et al.

(10) Patent No.: US 12,669,823 B2
(45) Date of Patent: Jun. 30, 2026

(54) TRACK REFINEMENT NETWORKS

(71) Applicant: Motional AD LLC, Boston, MA (US)

(72) Inventors: Jiong Yang, Singapore (SG); Lubing Zhou, Singapore (SG)

(73) Assignee: Motional AD LLC, Boston, MA (US)

( * ) Notice: Subject to any disclaimer, the term of this patent is extended or adjusted under 35 U.S.C. 154(b) by 629 days.

(21) Appl. No.: 18/073,104

(22) Filed: Dec. 1, 2022

(65) Prior Publication Data

US 2024/0126268 A1     Apr. 18, 2024

Related U.S. Application Data

(60) Provisional application No. 63/416,473, filed on Oct. 14, 2022.

(51) Int. Cl.
*G05D 1/00*          (2024.01)
*G06V 10/32*          (2022.01)
*G06V 10/774*          (2022.01)

(52) U.S. Cl.
CPC ......... *G05D 1/0248* (2013.01); *G05D 1/0212* (2013.01); *G06V 10/32* (2022.01); *G06V 10/774* (2022.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 11,537,819 B1 * | 12/2022 | Das | ......................... | G06F 18/24 |
| 2019/0096086 A1 * | 3/2019 | Xu | ............................. | G06T 7/60 |
| 2021/0078592 A1 * | 3/2021 | Febbo | .................. | G06V 40/103 |
| 2022/0058818 A1 * | 2/2022 | Qi | ......................... | G06V 10/764 |
| 2024/0034356 A1 * | 2/2024 | Clawson | ........... | B60W 60/0016 |

OTHER PUBLICATIONS

Yang et al ("Auto4D: Learning to Label 4D Objects from Sequential Point Clouds", arxiv.org, Cornell University Library, 201 Olin Library Cornell University Ithaca, NY 14853, Mar. 11, 2021 (Mar. 11, 2021), XP081901864) (Year: 2021).*

(Continued)

*Primary Examiner* — Leon Viet Q Nguyen
(74) *Attorney, Agent, or Firm* — Fish & Richardson P.C.

(57)     ABSTRACT

Provided are methods for a track refinement network. In examples, center boxes are obtained from a record of driving data, wherein a center box is a center of a sequence of boxes along a track, and the track is associated with a tracked object detected within the sequence of boxes, each respective box comprising a center, a size, and an orientation. Track windows are generated around respective center boxes, wherein a track window corresponds to a respective center box along the track. Track windows are cropped and normalized with respect to center boxes to enable single refinement model for multiple object classes. Point cloud features and trajectory features are extracted from the cropped and normalized track windows. The point cloud features and trajectory features are input into a track refinement network, wherein the track refinement network uses features from the entire track to output a refined center, a refined size, and a refined orientation of each respective center box.

20 Claims, 15 Drawing Sheets

500

(56)            References Cited

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

Lang et al., "PointPillars: Fast Encoders for Object Detection from Point Clouds," revised May 7, 2019, arXiv:1812.05784v2, 9 pages.

Fernandes et al., "Point-Cloud Based 3D Object Detection and Classification Methods for Self-Driving Applications: A Survey and Taxonomy," Information Fusion, available online Nov. 19, 2020, vol. 68, pp. 161-191.

International Search Report and Written Opinion in International Appln. No. PCT/US2023/034804, mailed on Dec. 11, 2023, 15 pages.

Qi et al., "Offboard 3D Object Detection from Point Cloud Sequences," 2021 IEEE/CVF Conference on Computer Vision and Pattern Recognition (CVPR), IEEE, Jun. 20, 2021, pp. 6130-6140.

Ruder, "An Overview of Multi-Task Learning in Deep Neural Networks," CoRR, Submitted on Jun. 15, 2017, arXiv:1706.05098v1, 14 pages.

Sabater et al., "Robust and Efficient Post-Processing for Video Object Detection," CoRR, Submitted on Sep. 23, 2020, arXiv:2009.11050v1, 7 pages.

Yang et al., "Auto4D: Learning to Label 4D Objects from Sequential Point Clouds," CoRR, Submitted on Mar. 11, 2021, arXiv:2101.06586v2, 8 pages.

International Preliminary Report on Patentability in International Appln. No. PCT/US2023/034804, mailed on Apr. 24, 2025, 9 pages.

* cited by examiner

500

702

706

704

Normalized Ground Truth Box 806

Normalized Input Box (Unit Square) 804

Regression Target: $\Delta x$ (810)/w(804), $\Delta y$(810)/l(804)

Regression Target: yaw (814)

Regression Target:
$\Delta w$/w(804), $\Delta l$/l(804)
$\Delta w$ = w(806) − w(804)
$\Delta l$ = l(806) − l(804)

Canvas

1200

Obtain Center Boxes   1202

Generate Track Windows   1204

Crop and Normalize the Track Windows with Respect to Center Boxes   1206

Extract Features from the Normalized Track Windows   1208

Input Features to Track Refinement Network   1210

Deploy Refined Center Boxes and Track Attributes   1212

TRACK REFINEMENT NETWORKS

CROSS-REFERENCE TO RELATED APPLICATIONS

This application claims priority to U.S. Provisional Application No. 63/416,473 filed on Oct. 14, 2022, the entire contents of which are incorporated herein by reference.

BACKGROUND

Autonomous vehicles rely on perception of the surrounding environment to ensure safe and robust driving performance. Perception systems use object detection techniques to identify and locate objects in the environment. Errors can be introduced into the object detection, which negatively impacts driving performance.

DETAILED DESCRIPTION

Figure 1:
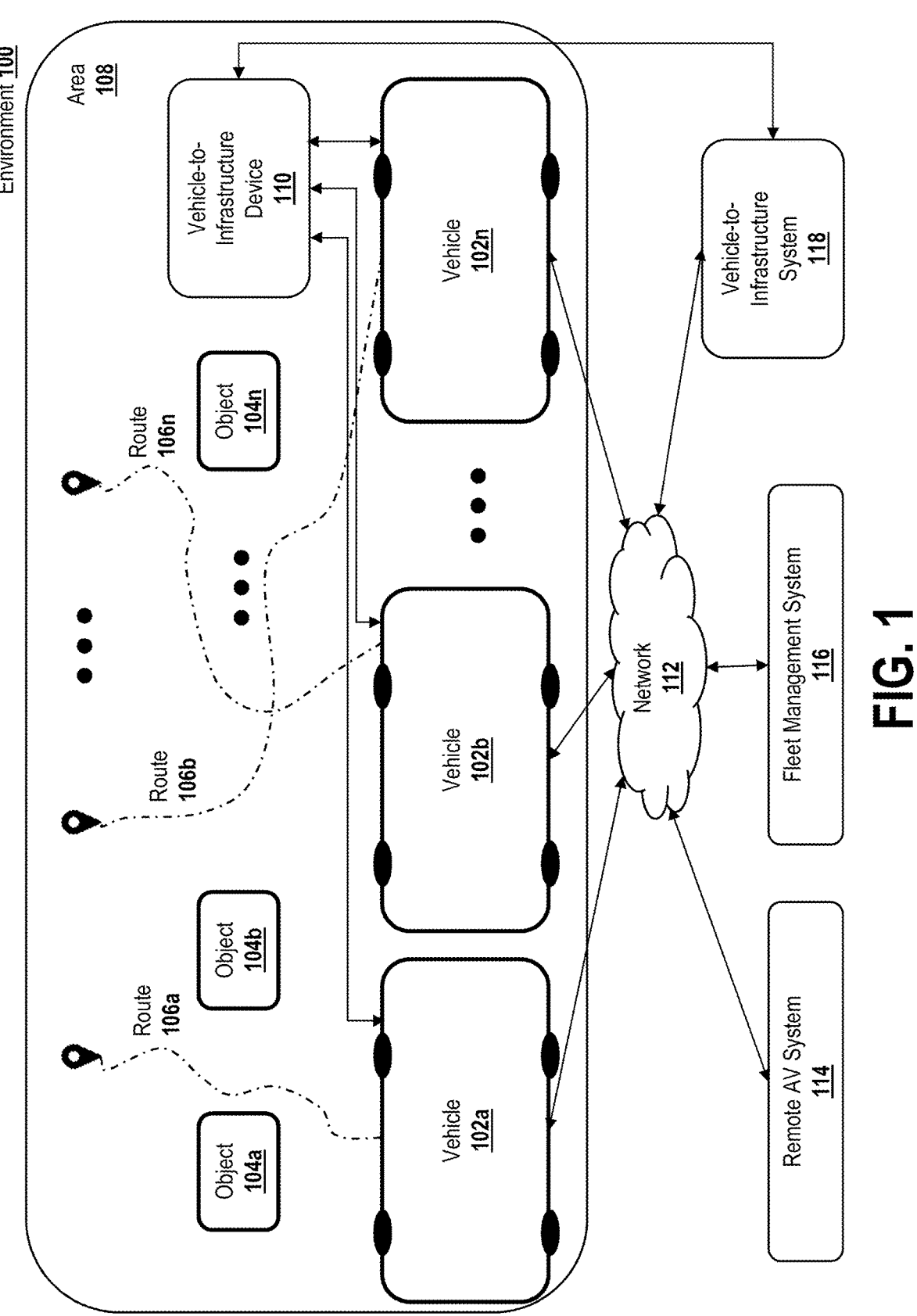
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement track refinement networks. A vehicle (such as an autonomous vehicle) includes systems that enable driverless functionality, including perception systems. Perception systems include machine learning systems that are trained using large scale datasets. Offline perception systems are used to generate automatically labeled training datasets. In examples, center boxes are obtained by an offline perception system. Track windows are generated around respective center boxes. Features are extracted from the track windows using encoded box-aligned and normalized canvases. The features are input to a track refinement network that outputs refined boxes (e.g., refined box center, refined box size, refined box orientation) and track attributes (e.g., velocity, motion status). The refined boxes are deployed for use in perception systems. In examples, refined center boxes are used in online perception. In examples, refined center boxes are used to enable image-LiDAR fusion. In examples, refined boxes are used to automatically generate high quality labeled datasets.

By virtue of the implementation of systems, methods, and computer program products described herein, techniques for track refinement networks are enabled. Some of the advantages of these techniques include the generation of a single model (e.g., track refinement network) to refine bounding boxes corresponding to objects with different classifications. Further, the track refinement network determines refinements using a residual between the original center box captured by the track window and the box-aligned canvas with a size norm. The present techniques do not regress extracted features from scratch (e.g., without utilizing or relying on any previously calculated bounding boxes). Rather, bounding boxes are used to determine a residual that is regressed to refine center boxes. Furthermore, a single model is applicable to multiple object classifications and multiple tasks.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
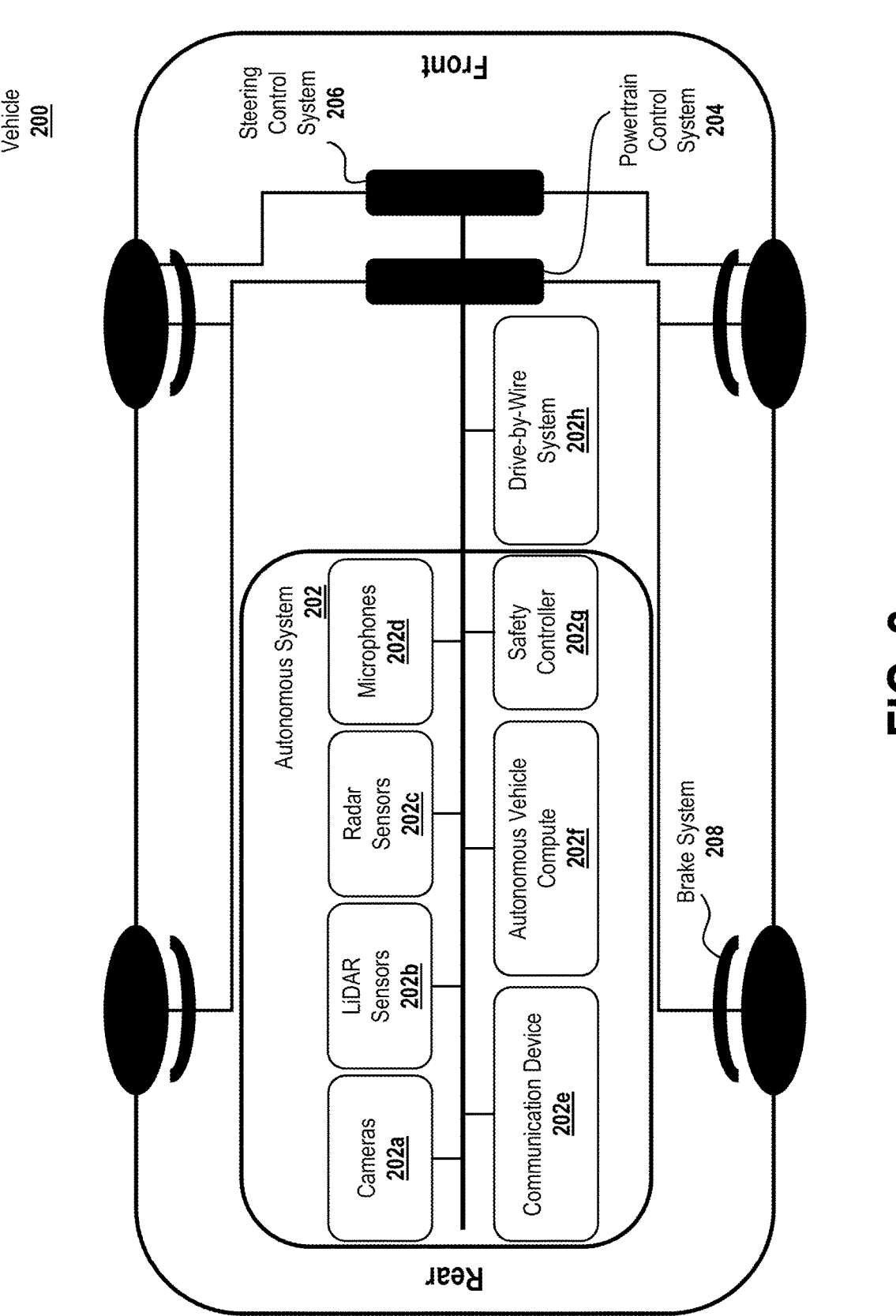
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
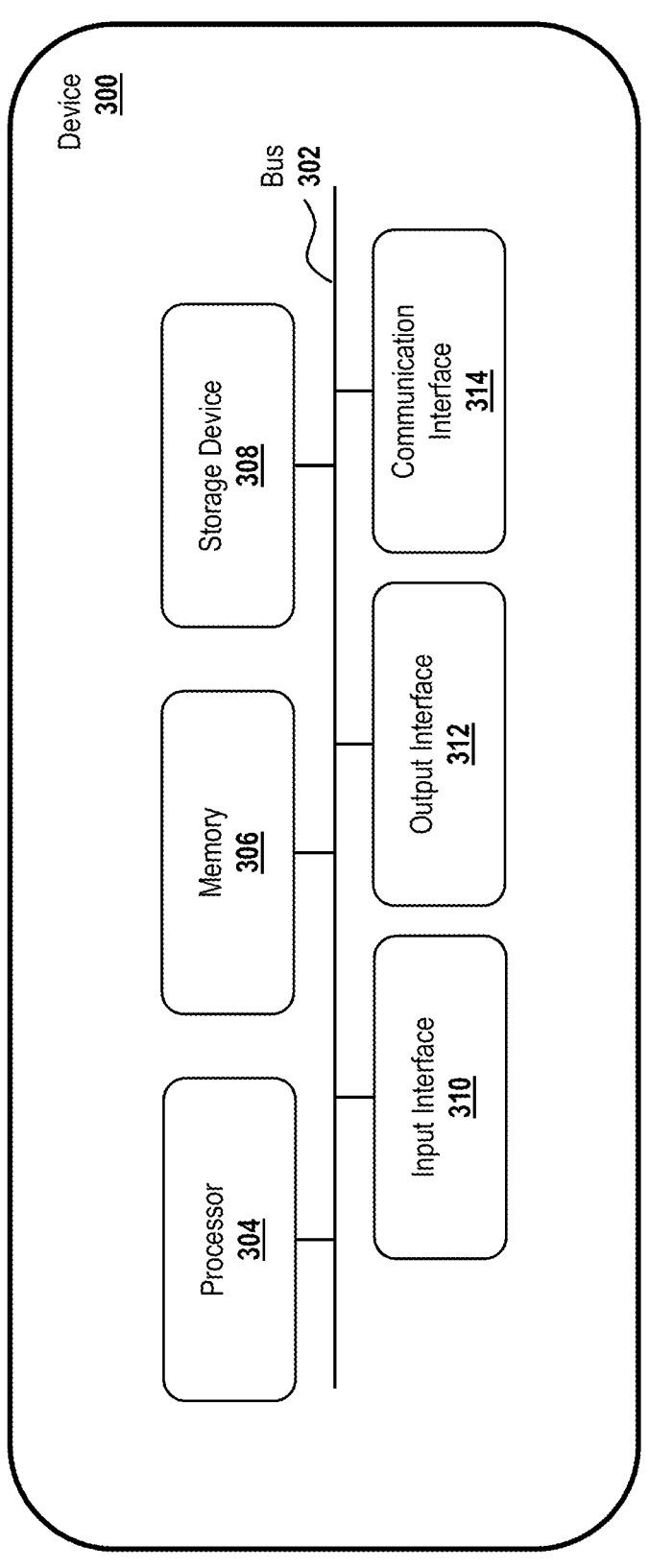
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, at least one device of fleet management system 116, at least one device of V2I system 118, and/or one or more devices of network 112 (e.g., one or more devices of a system of network 112). In some embodiments, one or more devices of vehicles 102 (e.g., one or more devices of a system of vehicles 102), at least one device of remote AV system 114, at least one device of fleet management system 116, at least one device of V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by micropro-cessors, microcontrollers, application-specific integrated cir-cuits (ASICs), Field Programmable Gate Arrays (FPGAs), and/or the like), or combinations of computer software and computer hardware. It will also be understood that, in some embodiments, autonomous vehicle compute 400 is config-ured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 clas-sifying the physical objects.

In some embodiments, planning system 404 receives data associated with a destination and generates data associated with at least one route (e.g., routes 106) along which a vehicle (e.g., vehicles 102) can travel along toward a des-tination. In some embodiments, planning system 404 peri-odically or continuously receives data from perception sys-tem 402 (e.g., data associated with the classification of physical objects, described above) and planning system 404 updates the at least one trajectory or generates at least one different trajectory based on the data generated by percep-tion system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localiza-tion system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road net-work connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial loca-tions of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data asso-ciated with the position of the vehicle. In some examples, localization system 406 generates data associated with the position of the vehicle based on localization system 406 determining the position of the vehicle. In such an example, the data associated with the position of the vehicle includes data associated with one or more semantic properties cor-responding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, pow-ertrain control system 204, and/or the like), a steering control system (e.g., steering control system 206), and/or a brake system (e.g., brake system 208) to operate. For example, control system 408 is configured to perform opera-tional functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
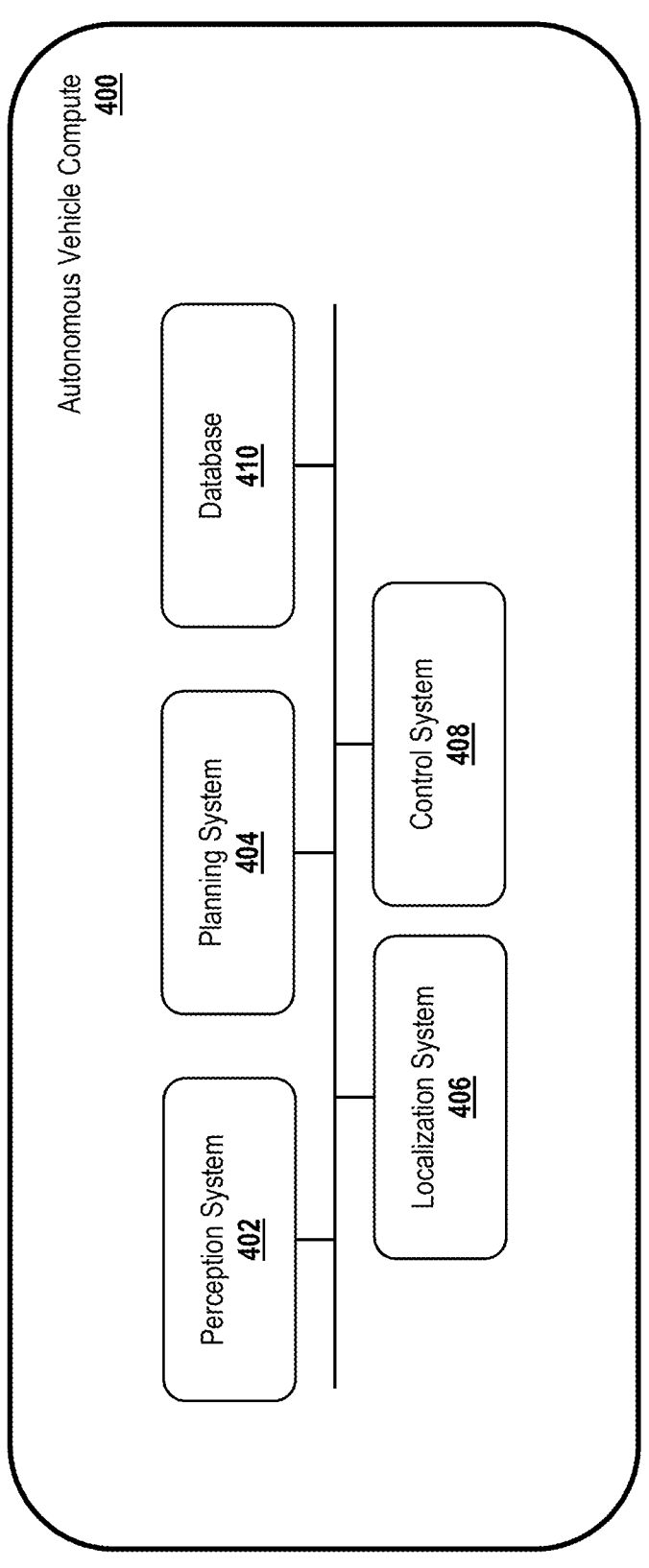
FIG. 4A is a diagram of certain components of an autonomous system.
Figure 4B:
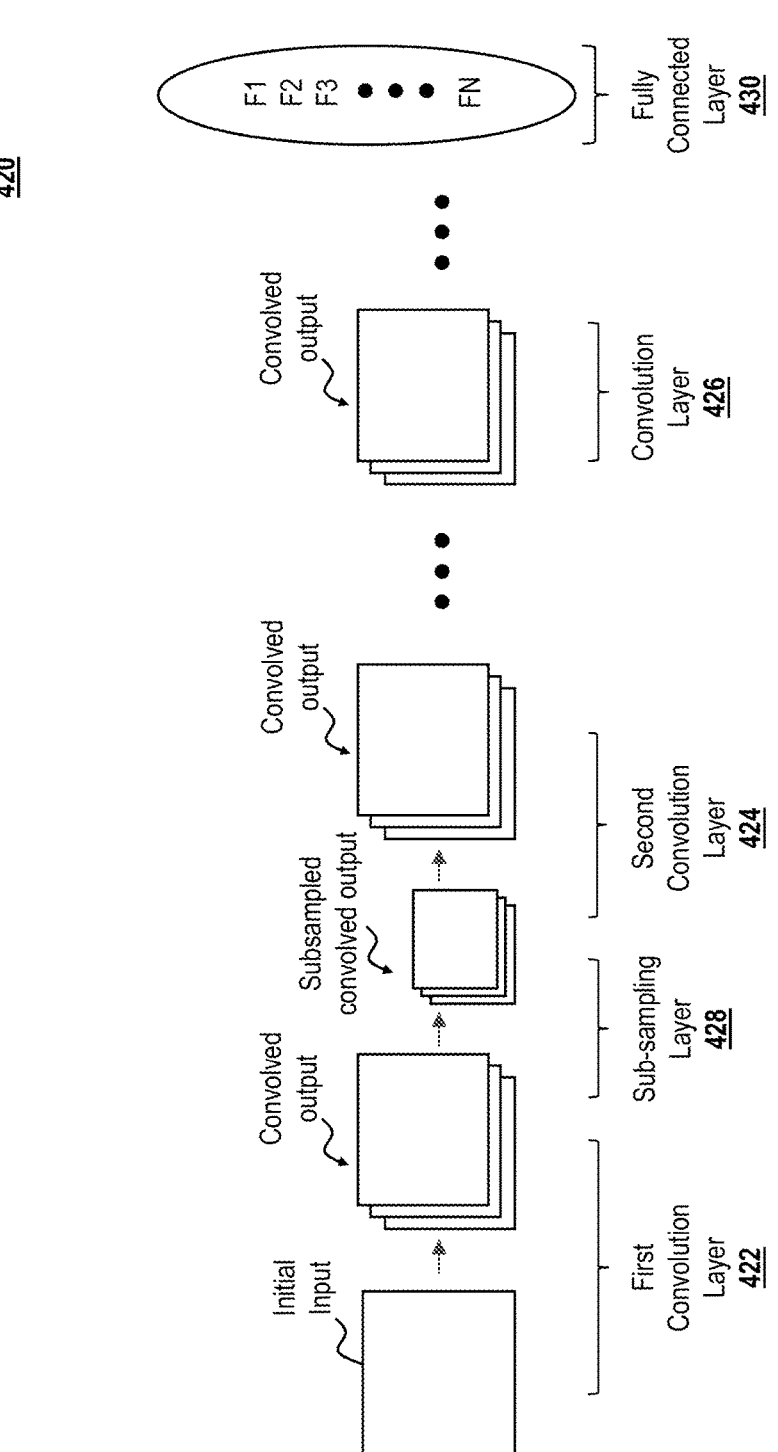
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
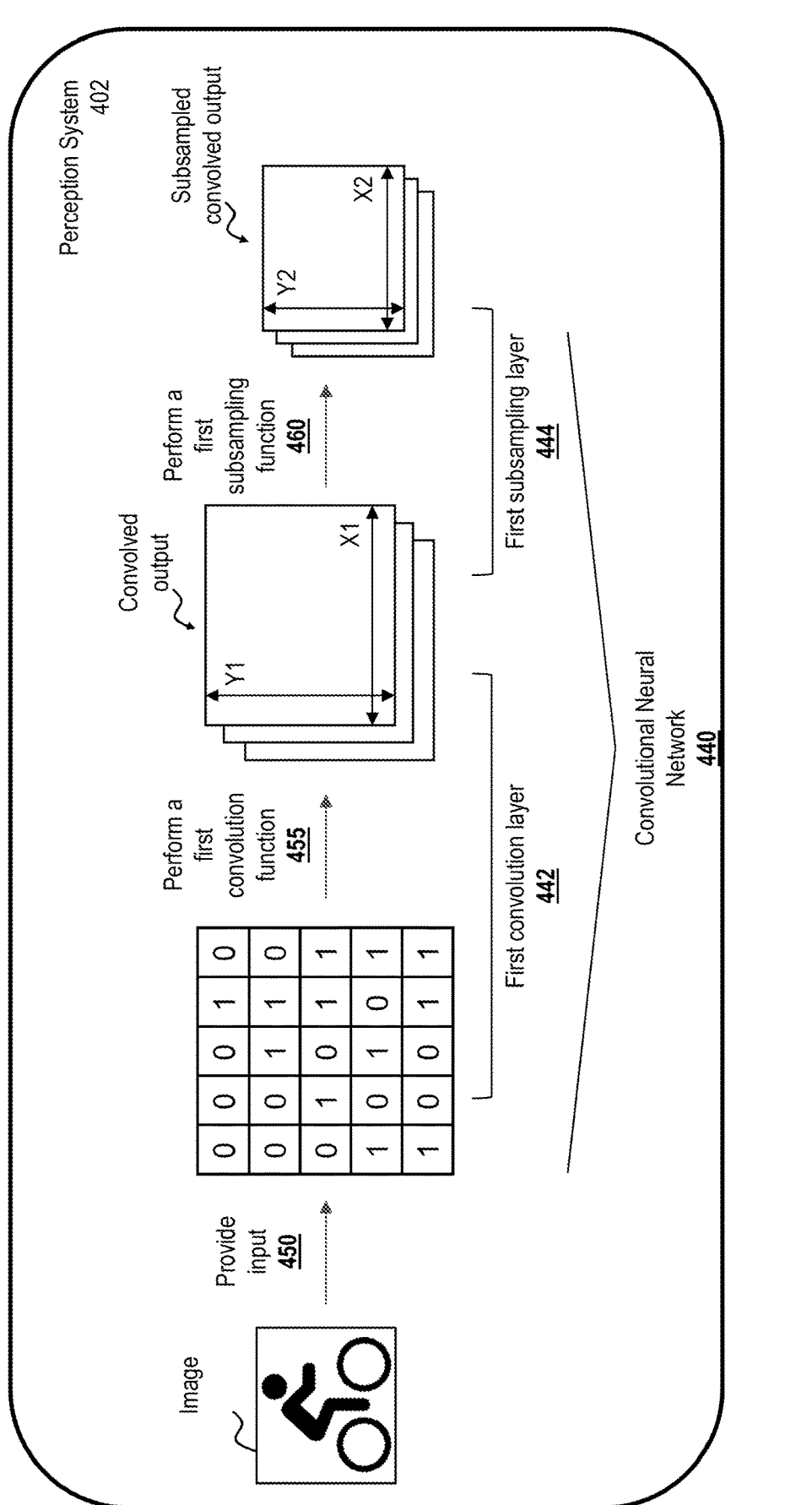
FIGS. 4C and 4D are a diagram illustrating example operation of a CNN.
Figure 4D:
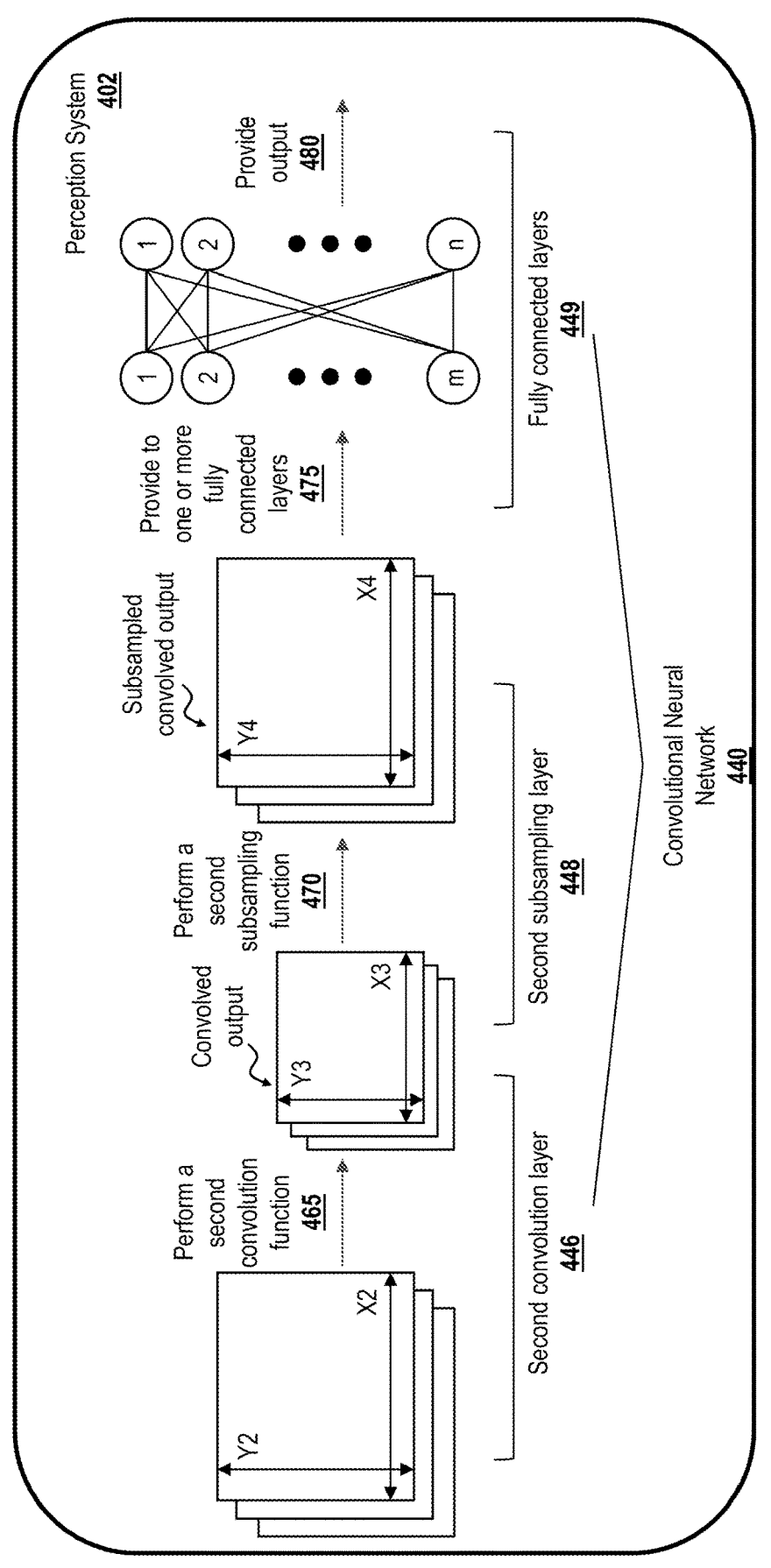

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of the first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
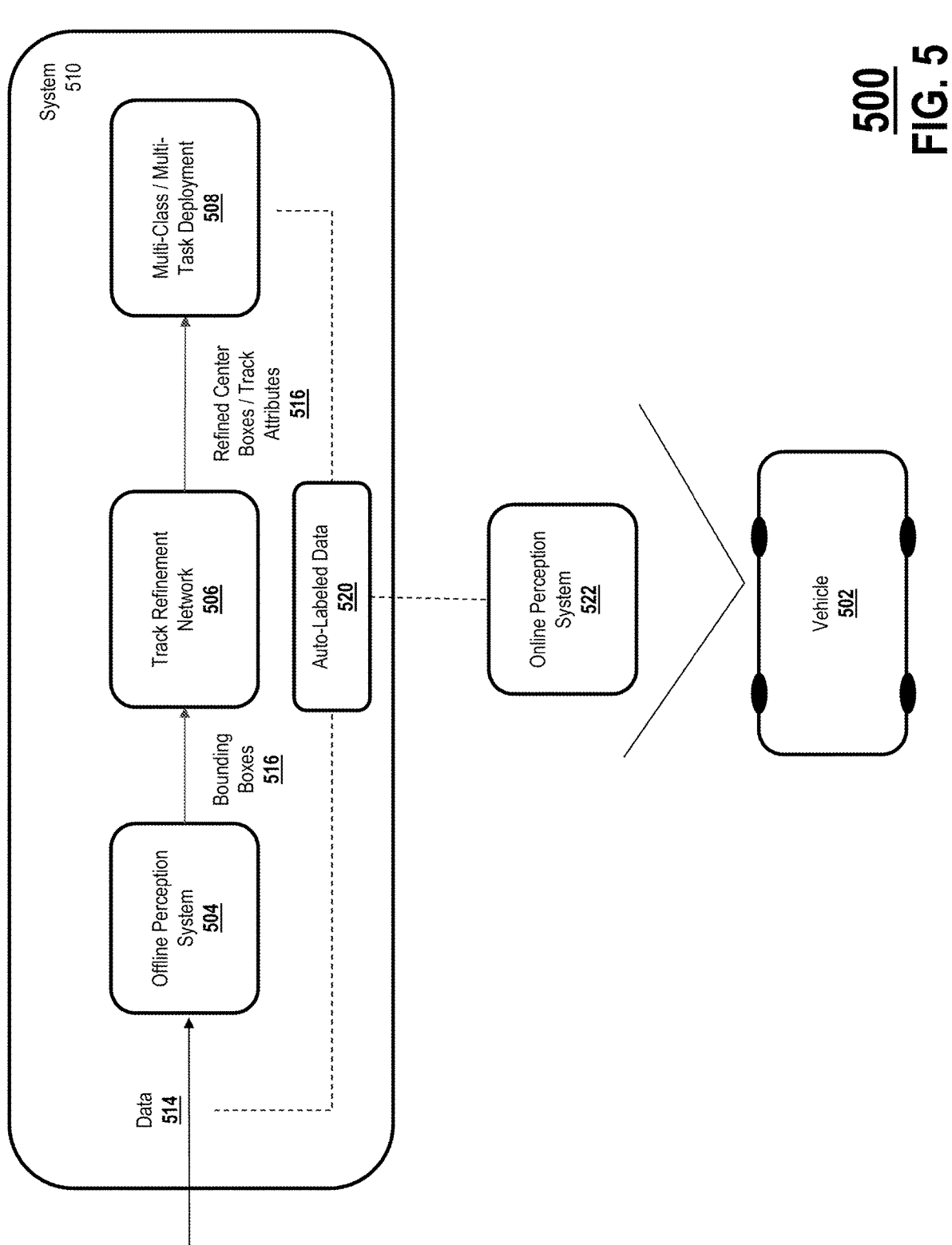
FIG. 5 is a diagram of an implementation of a track refinement network.

Referring now to FIG. 5, illustrated is a diagram of an implementation 500 of track refinement networks. In some embodiments, implementation 500 includes system 510, offline perception system 504, track refinement network 506, multi-class/multi-task deployment 508, automatically labeled data 520, and online perception system 522. In some embodiments, the implementation 500 is implemented in one or more devices of vehicles 102 (e.g., one or more devices of a system of vehicles 102), at least one device of remote AV system 114, at least one device of fleet management system 116, at least one device of V2I system 118, one or more devices of network 112 (e.g., one or more devices of a system of network 112), one device 300 and/or at least one component of device 300, and/or the AV compute 400 of FIG. 4.

In the example of FIG. 5, an offline perception system 504 receives data 514. Perception systems include online perception systems and offline perception systems. Perception systems receive data associated with at least one object (e.g., data that is used by the perception system to detect at least one physical object) in an environment and classifies at least one physical object. In embodiments, the perception system 504 detects objects over a period of time, and enables tracking of the object as the AV navigates through the environment. As the object moves in the environment, a track of the object's movement is generated. In particular, at least one bounding box including the detected object is generated. At each point along the track, the detected object is associated with one or more parameters, such as an orientation, center location of the at least one bounding box, and a size of the at least one bounding box. In examples, multiple bounding boxes are generated that encompass the object.

The perception system 504 labels data 514 with confidence scores that indicate the presence of a particular object class instance within an area of the environment associated with the data. In examples, the data 514 is a driving log that includes captured sensor data over a period of time (e.g., data from cameras 202a, LiDAR sensors 202b, radar sensors 202c, and microphones 202d of FIG. 2). The perception system 504 is an offline perception system that executes under minimal constraints. For example, an offline perception system operates outside of real time, enabling additional time for calculations that improve the perception system's ability to detect objects. In examples, offline perception systems include a delay between data generation and the processing of the data. An online perception system (e.g., online perception system 522) operates in real time. In examples, online perception systems execute on the AV and enable real time perception as the AV navigates through the environment. Online perception systems are implemented via an AV stack with a primary role of detecting objects in real time in a matter of milliseconds. In examples, when implemented via an AV stack, the computational power and memory of computer systems used to execute the online perception system onboard the AV are limited by cost and energy consumption. In embodiments, the offline perception system is cloud-based and is not limited by the constraints of an online perception system. For example, an offline perception system is a dedicated perception system with increased computational power and memory when compared with online perception systems.

The data 514 is used to estimate a set of bounding boxes for objects in the environment. Each bounding box is labeled with a likelihood that the bounding box contains a particular class of object. The objects include, but are not limited to, a pedestrian, vehicle, bike, bus and the like. In embodiments, the perception system includes an object detection neural network that is a feed-forward convolutional neural network that, given the inputs (e.g., sensor data), generates tracked bounding boxes 516 for potential objects in the two dimensional (2D) or three dimensional (3D) space and confidence scores for the presence of object class instances (e.g., cars, pedestrians, or bikes) within the bounding boxes. The higher the confidence score, the more likely the corresponding object class instance is present in a box.

The bounding boxes 516 are tracked 3D boxes with an associated orientation, size, and classification. At least one 3D object detection network semantically detects objects by identifying one or more object class instances in the sensor data. For example, an image 3D object detection network obtains image data as input and outputs a set of predicted 3D bounding boxes for potential objects in the 3D space and corresponding confidence scores for the presence of object class instances within the bounding boxes. The 3D bounding boxes include information about the size (e.g., dimensions), orientation, and location of a 3D bounding box for the object. In examples, the image 3D object detection network can also predict the class of each pixel in an image and outputs semantic segmentation data (e.g., a confidence score) for each pixel in the image. An example confidence score is a probability value that indicates the probability that the class of the pixel was correctly predicted.

Similarly, in examples a LiDAR 3D object detection network obtains LiDAR data as input and outputs a set of predicted 3D bounding boxes for potential objects in the 3D space and confidence scores for the presence of object class instances within the bounding boxes. The LiDAR data includes at least one point cloud. In an example, the 3D object detection network receives a plurality of data points that represent the 3D space. For example, each data point of the plurality of data points is a set of 3D spatial coordinates (e.g., x, y, z coordinates). Using one or more point clouds the 3D object detection network estimates oriented 3D bounding boxes for cars, pedestrians, and cyclists based on the point clouds. Similar to an image 3D object detection network, the predicted 3D bounding boxes output by the 3D object detection network include information about the size, orientation and location of a 3D bounding box for the object. The predicted 3D set of bounding boxes also include confidence scores for the presence of object class instances within the bounding boxes.

During object detection per-pixel confidence scores create many high-scores that are close to one another, thereby generating a large number of predicted 3D bounding boxes that ultimately create a large number of projected bounding boxes with associated confidence scores associated with the same detected object. Non-maximum suppression suppresses scores that are not locally maximum within a local range. In some embodiments, non-maximum suppression is used to determine a final predicted bounding box, or center box. In one or more embodiments, the object detection includes determining a center box for each set of bounding boxes, where the center box is a region of the sensor data where per-pixel confidence scores are above a predetermined threshold. The center box has an associated center location (e.g., centroid), a center box size (e.g., length, width, and height), and a center box orientation.

The track refinement network 506 receives as input the tracked bounding boxes 516 associated with detected objects and a track of each detected object. The center boxes of a detected object are located along the track of the object according to time. In examples, the track refinement network obtains center boxes and object tracks over a large time window, and incorporates center boxes at future timestamps into the processing of data at a current center box. Since the center boxes are a sequence of center boxes at a series of timestamps, the track refinement network incorporates data from the entire track window to refine each center box.

In embodiments, the track refinement network 506 outputs refined center boxes and track attributes 518. For example, the track refinement network 506 outputs a refined center box with a refined center location, a refined center box size, and a refined center box orientation. Track attributes include but are not limited to a velocity and a motion state of the object (e.g., if the track is static or dynamic). The refined center boxes and track attributes are deployed for use in multi-class/multi-task deployment 508. In examples, the refined center boxes are used to identify an area of the environment to interpret the associated per-pixel confidence scores as corresponding to a particular object class instance across multiple classes. In examples, the refined center boxes and track attributes are used to train the online perception systems. The track refinement network executes fast enough for real time deployment and can also be used in an online perception system by only using past boxes to refine the boxes in the current frame. For example, the output of an offline perception system generates auto-labelled velocity data. The velocity attribute can be refined according to the present techniques, and used to train and improve the velocity predictions made by the online perception system. In some embodiments, the refined boxes are used to update a tracking model for improved future tracking or trajectory prediction. Additionally, planning systems use the refined center boxes for future planning. In some embodiments, the refined center boxes are used in image-LiDAR fusion to ensure well aligned fusion features.

Additionally, in some embodiments, deployment 508 includes automatically labeling the data 514 with the refined center boxes and track attributes. The automatically labeled data 520 is used to train online perception systems 522 that execute on AV 502. In an example, a driving log including recorded sensor data is collected from a database. An adaptive canvas is used to encode the data, and the track refinement network outputs refined center boxes and track attributes for a first stage that automatically labels the data 514. The automatically labeled data 520 is used to train an online perception system 522 in a second stage.

In embodiments, offline perception enables a continuous learning framework, where driving data is continually mined for difficult scenarios by comparing detections (e.g., detected objects) from online perception systems and offline perception systems. In some cases, the input to the online perception systems and offline perception systems is the same, and the output of the systems disagrees. For example, an online perception system may not detect a pedestrian hidden behind a tree for one or more timestamps as a vehicle navigates through the environment. However, offline perception systems use foresight and hindsight across one or more timestamps as a vehicle navigates through the environment. The offline perception system determines that the pedestrian observed in the past and in the future is also present at timestamps of sensor data where the pedestrian is partially occluded by a tree with poor sensor data. Thus, offline perception systems enable object permanence, wherein the AV is aware of the existence of an object even when it is difficult to have good observation of the object. . . . In examples, when the offline and online perception systems disagree with on object detections, the offline perception system output is used as training data to improve online perception systems.

Figure 6:
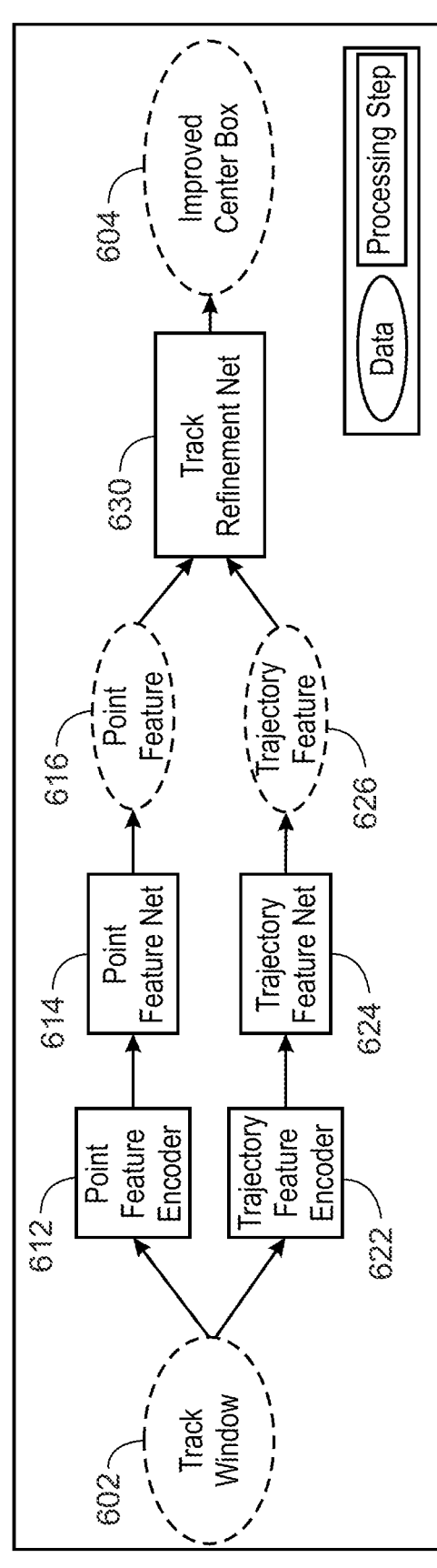
FIG. 6 is an illustration of an architecture of a track refinement network.

FIG. 6 is an illustration of an architecture including a track refinement network. The architecture 600 can be implemented (e.g., completely, partially, etc.) using a perception system that is the same as or similar to perception system 402, described in reference to FIG. 4. Additionally, the architecture 600 can be implemented (e.g., completely, partially, etc.) using a perception system that is the same as or similar to perception systems 504 and 522, described in reference to FIG. 5. In some embodiments, the architecture is implemented (e.g., completely, partially, and/or the like) by another device or system, or another group of devices and/or systems that are separate from, or include, the perception system. For example, the architecture can be implemented (e.g., completely, partially, and/or the like) by a remote AV system 114 described in reference to FIG. 1 and/or AV compute 400 (e.g., one or more systems of AV compute 400). In some embodiments, the architecture is implemented (e.g., completely, partially, and/or the like) by a device 300 described in reference to FIG. 3.

In examples, the track refinement network 630 refines center boxes by utilizing the long-term temporal context captured by a track of the object. A set of predicted bounding boxes is obtained. The set of predicted bounding boxes is generated by, for example, an object detection neural network. The center boxes from each set of bounding boxes at a series of timestamps form a sequence of center boxes along a track. The track is associated with an object detected within the center boxes, each respective center box comprising a center location, a center box size, and a center box orientation. Track windows are generated around respective center boxes, wherein a track window corresponds to a respective center box at a timestamp along the track, and a set of context boxes at nearby timestamps from the same track around the center box. For example, for a track window of radius 50, it includes the center box at time stamp t, 50 boxes from the same object track just before timestamp t, and 50 boxes from the same track just after the timestamp t. In examples, N=50 for window radius of 50, for a total of 101 boxes in the track window. Features are extracted from the track windows, and the track windows are cropped and normalized to create canvases corresponding to respective center boxes. The canvases are encoded to obtain features. The features are input to a track refinement network, wherein the track refinement network uses features from the entire track window to output a refined center, a refined size, and a refined orientation of each respective center box. In some embodiments, the track window 602 is used to create an adaptive canvas corresponding to each respective track window. Canvases are further described with respect to FIGS. 8-9. Data from the entire sequence of boxes within the track window is used to refine the center box. The track window is encoded by an adaptive canvas, and the adaptive canvas is input to the point feature encoder 612 and trajectory feature encoder 622.

Figure 7A:
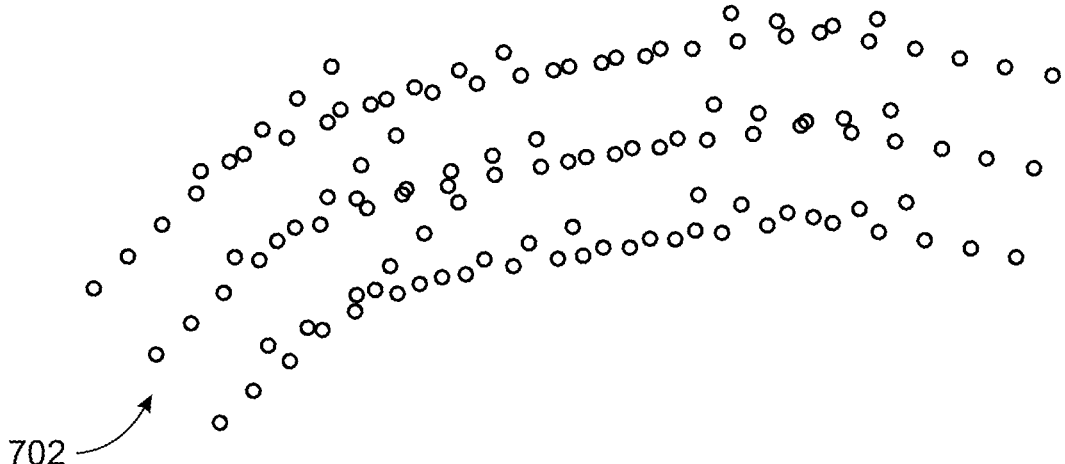
FIG. 7A illustrates points associated with multiple boxes for encoding.
Figure 7B:
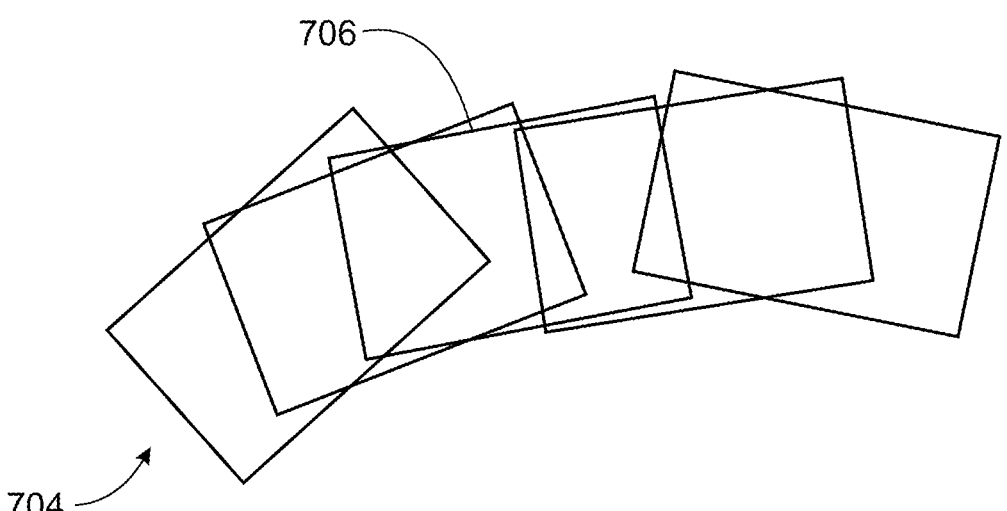
FIG. 7B illustrates multiple boxes.

In the example of FIG. 6, data is illustrated with blocks using dashed lines, while processing applied to the data is shown using blocks with solid lines. In the example of FIG. 6, data associated with a track window 602 is used to generate a canvas for input to a point feature encoder 612 and a trajectory feature encoder 622. In examples, the point feature encoder 612 takes as input an adaptive canvas including raw point features including x, y, z, intensity, and a time delta. For example, the raw point features are data captured by a LiDAR representing a 3D space surrounding a vehicle. The point feature encoder 612 outputs pillar features sized with a width (W), height (H), and a number of channels for each pixel of the canvas (W*H*$C_{pi}$). In embodiments, the point feature encoder 612 can include PointPillars, as consistent with at least some implementations, as described in PointPillars: Fast Encoders for Object Detection from Point Clouds, arXiv:1812.05784v2[cs.LG] 7 May 2019. FIG. 7A illustrates points 702 associated with multiple boxes for encoding. In examples, the points 702 are input to the track refinement networks. The points 702 represent a union of all the points within a track window, while FIG. 7B represents a corresponding bounding box trajectory which is also the input to the track refinement network. In the example of FIG. 7A, the aggregated points inside tracked boxes of a track window with length 5 (or radius 2) is shown. The center box points occur at reference number 703, corresponding to the box 706 shown in FIG. 7B.

In examples, the point feature encoder 612 applies a point pillar encoding to the points from all the boxes of the track window, dilated spatially to include more context along the track of the object. For example, each data point of the plurality of data points is a set of 3D spatial coordinates. The 3D space is divided into a plurality of pillars, in which each pillar of the plurality of pillars extends vertically (in the z-direction) from a respective portion of the 2D ground plane of the 3D space. Each data point of the plurality of data points is assigned to a pillar in the plurality of pillars. A pseudo-image is generated based on the plurality of pillars. The pseudo-image includes, for each pillar of the plurality of pillars, a corresponding feature representation (e.g., W*H*$C_{pi}$ pillar features) of data points assigned to the pillar.

The point feature network 614 obtains the W*H*$C_{pi}$ pillar features as input. A CNN network (i.e. VGG, or ResNet architecture) is used to extract a single feature vector representing the entire point cloud for each respective track window around the center box (e.g., 10 boxes prior to the center box in time, and 10 boxes following the center box in time). For example, as discussed above, a track window is a temporal series of tracked boxes around the center box. In an example, a center box at box t (e.g., a center box), with a radius of the track window of 10 is identified. The track window will include 10 tracked boxes from box t+1 to t+10, and 10 boxes from box t−10 to t−1 for a total of 21 boxes that track the same object. The points within these 21 boxes will be used for the point feature encoding. The 21 boxes will be used for trajectory encoding. The boxes are represented by a center location and a size including length and width. For example, the features are encoded using the x-coordinate of box center (e.g., x), y-coordinate of box center (e.g., y), box width (e.g., w), box length (e.g., w), orientation of the box (e.g., yaw), and timestamps associated with each respective box (e.g., a time difference an other box and the center box). In examples, other features of the boxes are specified such as the height, orientation, and the like. The point feature network 614 outputs point features 616. The point features 616 are 1×1*$C_p$ features that represent the point cloud structure of the object track.

In parallel with the point feature encoder 612, the trajectory feature encoder 622 takes as input an adaptive canvas including raw center box features including center_x, center_y, width, length, yaw angle, and delta_time for $N_t$ boxes in a track window. In examples, $N_t$=101, where the set of predicted bounding boxes includes 101 bounding boxes. The trajectory feature encoder 622 outputs trajectory features for $N_t$ boxes, $C_{ti}$ channels per box, with a dimension $N_t*C_{ti}$. The trajectory feature network 624 obtains $N_t*C_{ti}$ trajectory features extracted from $N_t$ context boxes as input. In embodiments, the trajectory feature encoder is a one dimensional (1D) CNN or MLP network that extracts Ct features representing the trajectory and motion of the object track. The trajectory feature network 624 outputs trajectory features 626.

The point features 616 and the trajectory features 626 are input to a track refinement network 630. In examples, the track refinement network 630 is an MLP network that regresses multiple task heads from the concatenated point features and trajectory features. In examples, the point features 616 are represented by a first feature vector and the trajectory features are represented by a second feature vector. The first feature vector and the second feature vector are concatenated and input to the track refinement network 630. The track refinement network outputs a refined, improved center box 604 as with a refined center location, refined box size, and a refined box orientation. In embodiments, track attributes such as velocity and motion state are output by the track refinement network 630.

Figure 8:
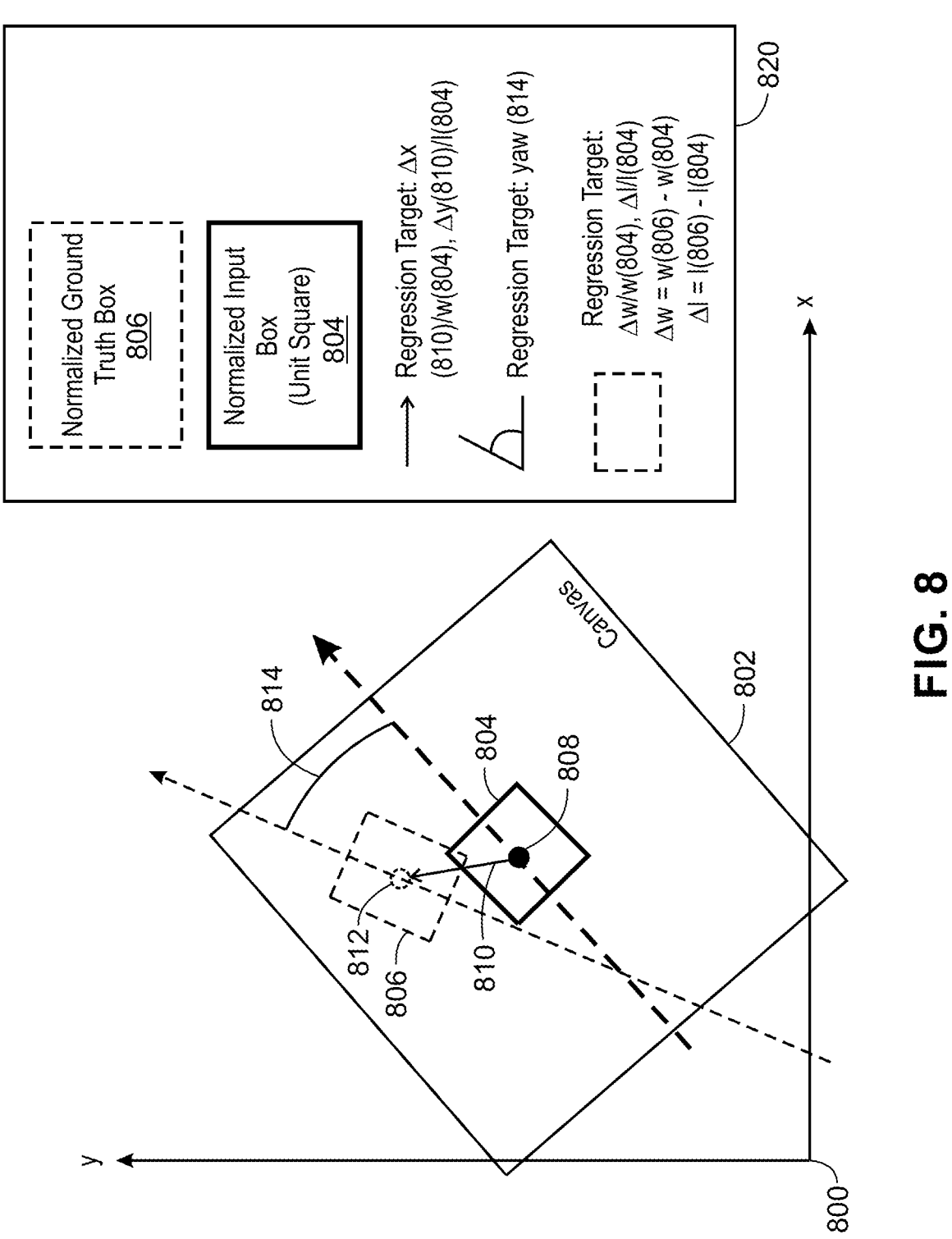
FIG. 8 is an illustration of a vehicle coordinate frame of reference and canvas.

FIG. 8 is an illustration of a vehicle coordinate frame of reference 800 and canvas 802. In examples, the coordinates of the vehicle match the coordinates of the canvas used for encoding as described with respect to FIG. 6. A center location 808 within a center box 804 represents the center of the center box 804. The box 806 on the canvas is the ground truth box location. The canvas is used to encode all the points within the track window of the center box. The legend 820 shows that the normalized ground truth box 806 is illustrated in FIG. 8 using dashed lines, and the center box (e.g., normalized input box) 804 is illustrated using solid lines.

As shown in the legend 820, regression target variables include a residual location that indicates a distance that the center box 804 is shifted to align with ground truth box 806 shown on the canvas as arrow 810. In particular, arrow 810 represents regression target variables that indicate a change in position (e.g., residual location) of the center location 808 as the change along the x-dimension (e.g., $\Delta x$) divided by the width (e.g., w) of the center box 804 and the change alone the y-dimension (e.g., $\Delta y$) divided by the length (e.g., l) of the center box 804. As shown in the legend 820, the regression target variable also include a residual orientation that indicates an angle (e.g., yaw) that the center box 804 is rotated to align with ground truth box 806, shown on the canvas as angle 814. The regression target variables also include a residual size that indicates a change in size of the center box 804 to obtain the ground truth box 806. The residual size (e.g., in terms of width and length) is calculated as the change in width (e.g., $\Delta w$) between box 804 and 806 divided by the width of the center box 804 and the change in length (e.g., $\Delta l$) between box 804 and 806 divided by the length of the center box 804.

In embodiments, the canvas 802 is cropped from the track window 602 of FIG. 6 for respective center boxes obtained from object detection neural networks. The canvas is an encoding canvas with a center location that is co-located with the center of respective center boxes corresponding to a track window. The points for encoding within the track windows are cropped based on the canvas. The canvas 802 is a box aligned canvas with a coordinate system corresponding to a coordinate system of the center box. A size of the canvas is based on the size of the corresponding center box.

A center box 804 is illustrated. A track window (not illustrated) is generated around the center box 804, and is cropped to obtain the canvas 802. As described with respect to FIG. 9 the encoding canvas is scaled according to the size of the input center box. For ease of illustration, the canvas 802 is depicted as square in shape. However, the canvas is sized according to the center box and can be of any shape of size. In examples, the canvas is scaled and normalized using the input center box. In examples, the input box is normalized to a unit square. The absolute size of the canvas in meters is relative to the size of the center box. In examples, the canvas is selected to be three times larger than the center box to capture context surrounding the center box. In examples, the canvas is selected to be other sizes. The absolute canvas size (in meters) will be different for different center boxes. The feature size of each canvas, i.e., W*H, is always the same by using different pillar size, with W pillars along width direction and H pillars along the length direction. In examples, the context refers to a region outside of the center box. The context enables consideration of the regions outside the object (e.g., road surface) that supports a better understanding of the location of the box. Additionally, including more context enables the track refinement network to see the entire object, even when the center box does not capture the full exterior of the object.

The canvas 802 is rotated to align with a respective center box 804, scaled according to a size of the respective center box 804, and normalized using the size of the respective center box. In this manner, canvases are adaptively scaled and normalized based on the input center box. In embodiments, the input center box is used as an initial estimate to regress the center box size, orientation, heading, and location. A residual between the input center box and a normalized ground truth box is regressed to determine the refined center box. As described herein, the residual is the offset from the input box that represents a distance between the input center box and a normalized ground truth box 806. In examples, a training database that stores tracks includes center box and ground truth box pairs. In a database generation phase, a global association is performed between the ground truth tracks and the tracks generated from an offline perception system based on their proximity to each other. After training, the track refinement network is deployed. During deployment, the ground truth boxes are not used. Instead a center box (e.g., box to refine) is obtained along with the residual from the track refinement network output to generate a refined center box. In examples, the refined center box is close to the ground truth.

A normalized ground truth box 806 is illustrated in the vehicle coordinate system 800. In examples, regression target variables are the immediate output of the track refinement network. The track refinement network is trained to output regression target variables. At deployment, the regression target variables will be de-normalized by the input box to obtain the refined center box in the vehicle coordinate system. The normalized ground truth box 806 represents a regression target, wherein the input center box 804 is rotated and aligned with the normalized ground truth box 806. The center 808 of center box 804 is shifted by the distance illustrated by arrow 810 to align with the center 812 of the normalized ground truth box 806. Additionally, the center box 804 is rotated by the angle illustrated at reference number 814 to align with the normalized ground truth box 806. After alignment and size normalization, the canvas is provided as input for encoding, such as by the point feature encoder and the trajectory feature encoder. In examples, the encoding encodes the center boxes into a 2D shape for processing by a neural network, such as a 2D CNN.

The present techniques enable regression of the residual of each of the size, orientation, and location of the center boxes. The input center boxes are used as reasonably good estimates, and regressing the residual is easier and computationally efficient. In examples, scaling enables the present techniques to support multi-class track refinement. This is due to the size normalization, as the same canvas can be applied to the different classes with different shape statistics. The size of the canvas will be up/down scaled to match the size of the center box. In some embodiments, the absolute size of the canvas in meters is relative to the size of the center box. For example, the canvas is three times larger than the center box to capture enough context. The absolute canvas size (in meters) will be different for different center boxes. The feature size of each canvas, i.e., W*H, is always the same by using different pillar sizes, so there are W pillars along the width direction and H pillars along the length direction. In embodiments, the track refinement network can be used across multiple object classifications of any size.

Figure 9:
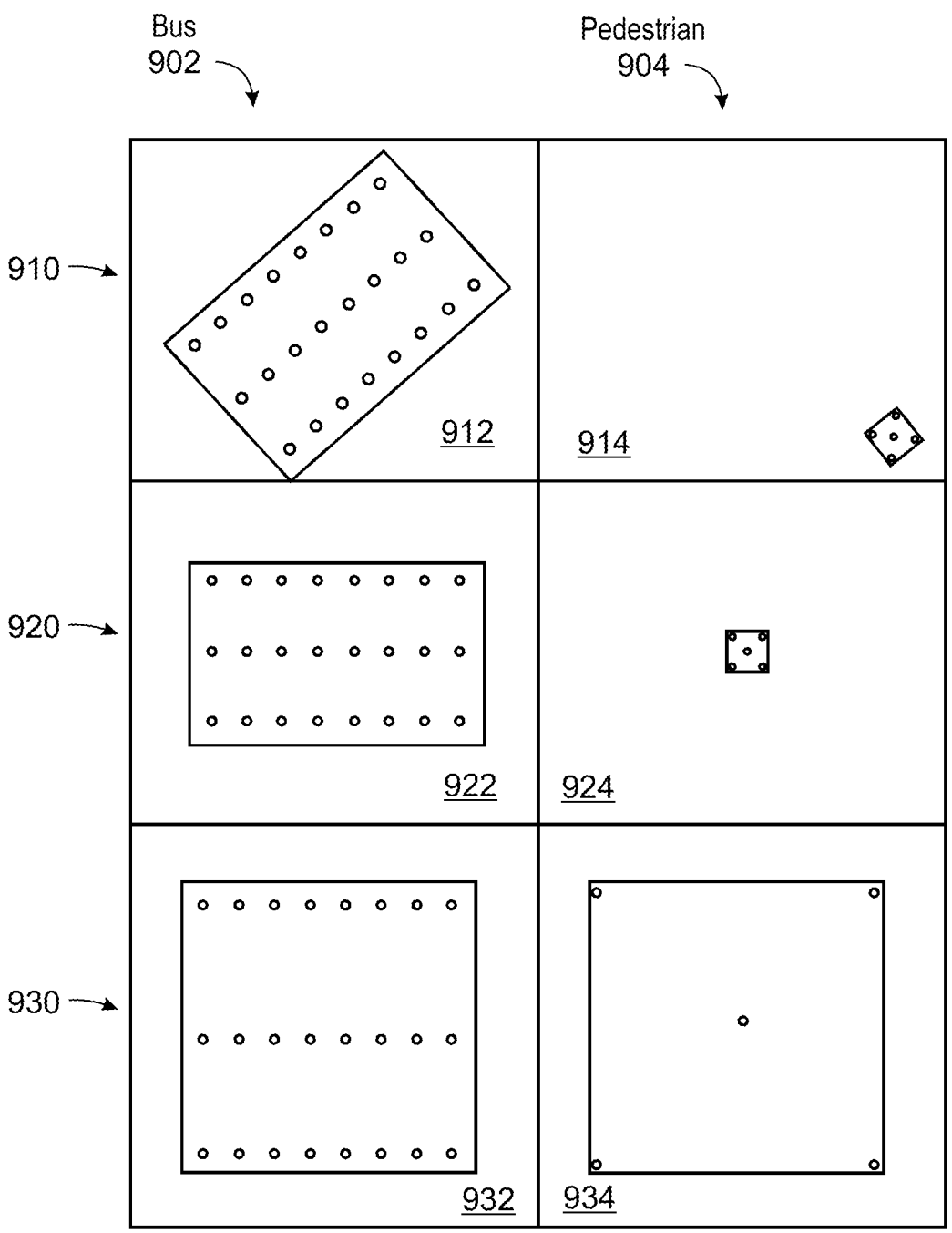
FIG. 9 is an illustration of classes and corresponding points for each class.

FIG. 9 is an illustration of classes with different shape statistics and corresponding points for each class. In examples, point cloud data points are cropped to those points occurring within a respective canvas.

In the example of FIG. 9, a bus class 902 and a pedestrian class 904 are shown after various processing to obtain canvases. At row 910 a single canvas size is used for both the bus class 902 and the pedestrian class 904. Traditionally, a single canvas size is a fixed size around the center box. At row 910, points of the bus class are shown within an input center box within a cropped canvas 912. At row 910, a cropped canvas 914 of the same size is applied to the pedestrian class 904. As illustrated, the cropped canvas 912 at row 910 is too small to capture the entire center box representing the bus class 902. Additionally, the cropped canvas 914 at row 910 represents the points corresponding to the pedestrian at a course resolution at the center of the canvas, with data points occurring in a small portion of the canvas while the remainder of the canvas is wasted.

At row 920 a single canvas size is used for both the bus class 902 and the pedestrian class 904. However, the canvas is rotated to align with the respective center boxes. At row 920, points of the bus class 902 are shown within an input center box within a cropped canvas 922, rotated to align with the center box. At row 910, a cropped canvas 924 of the same size is applied to the pedestrian class 904, and the canvas is rotated to align with the center box. As illustrated, the cropped canvas 922 used at row 920 captures the entire center box representing the bus class 902. However, the cropped canvas 924 at row 920 still captures the points corresponding to the pedestrian class 904 at a course resolution at the center of the canvas, with data points occurring in a small portion of the canvas while the remainder of the canvas is wasted.

As illustrated in the example of FIG. 9, a single canvas setting (e.g., size) adversely impacts processing for objects with different shape statistics, such as size. When the canvas is too small, the canvas is unable to capture data points associated with the entire object and proper portion of the surrounding environment. When the canvas is too large, the points are represented at a coarse resolution in a small area of the canvas, in which the canvas features will be dominated by the wasted background data locations on the remainder of the canvas.

At row 930, an adaptive canvas is illustrated. The adaptive canvas is normalized according to the size of the input center box. The adaptive canvas is a box aligned canvas with size normalization. The adaptive canvas 932 at row 930 is applied to the bus class 902. The canvas 932 is rotated to align with the center box, and scaled according to the size of the center box. At row 930, an adaptive canvas 934 is applied to the pedestrian class 904, and the canvas 934 is rotated to align with the center box and scaled according to the size of the center box. As illustrated, the adaptive canvas 932 used at row 930 captures the entire center box representing the bus class 902. The adaptive canvas 934 at row 930 also captures the points corresponding to the pedestrian class 904 at a fine resolution at the center of the canvas, with data points occurring throughout the canvas.

Figure 10:
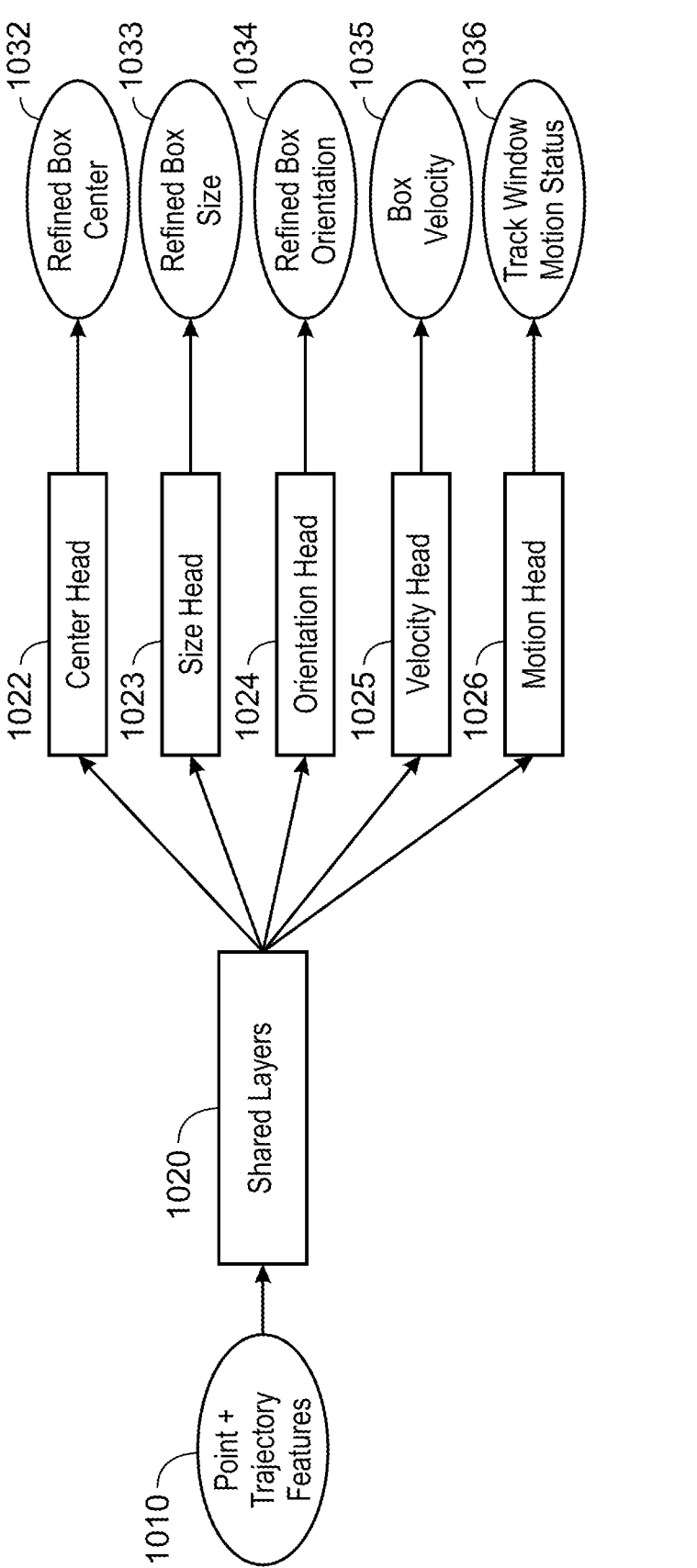
FIG. 10 is a block diagram of a multi-task track refinement network.

At row 930, although the physical size of the pedestrian is much smaller than the bus, because each object is processed using an encoding canvas normalized by the respective center box size, the encoding canvas can adapt to respective shapes and sizes of the detected object. If the object itself is big, then a big encoding canvas is generated. If the object is small, a small encoding canvas is generated to ensure details of the smaller object are captured. The use of an adaptive canvas reduces computational waste by reducing areas of the canvas without data. Further, the adaptive canvas enables refinement of multiple classes with varying shapes and sizes using a single track refinement network rather than multiple class-specific track refinement networks. This can greatly save the training and deployment efforts FIG. 10 is a block diagram of a multi-task track refinement network. The track refinement network 1000 can be implemented (e.g., completely, partially, etc.) using a track refinement network that is the same as or similar to track refinement network 630, described in reference to FIG. 6. In the example of FIG. 10, the track refinement network 1000 executes multiple tasks in parallel. Concatenated points features and trajectory features 1010 are input into shared layers 1020. In some examples, the concatenated points and trajectory features 1010 are the point features 616 and the trajectory features 626 as described in reference to FIG. 6.

The present techniques enable the execution of multiple tasks using a single model. The track refinement network includes shared layers 1020 and task heads including center head 1022, size head 1023, orientation head 1024, velocity head 1025, and motion head 1026. The task heads receive data from the shared layers 1020. The center each 1022 outputs a refined box center 1032 (e.g., x. y. z). The size head 1023 outputs a refined box size 1033 (e.g., length, width, height). The orientation head 1024 outputs a refined box orientation 1034 (e.g., yaw angle). The velocity head 1025 outputs a refined box velocity 1035 ($v_x$, $v_y$). The motion head 1026 outputs a track window motion status 1036 (e.g., static or moving).

To execute multiple tasks, a number of different heads are placed at the last few layers of the track refinement network. Accordingly, the track refinement network outputs for example, a refined center box center, a refined center box size, and a refined center box orientation. Additionally, track attributes are estimated and output by the track refinement network. The track attributes include but are not limited to velocity and motion state (e.g., if the track is static or dynamic). In examples, the velocity head 1025 predicts the velocity using the object track corresponding to the center boxes as input, which is used for encoding features as described above. Similarly, the motion head 1026 determines whether the object is static or moving using the object track corresponding to the center boxes as input.

Figure 11:
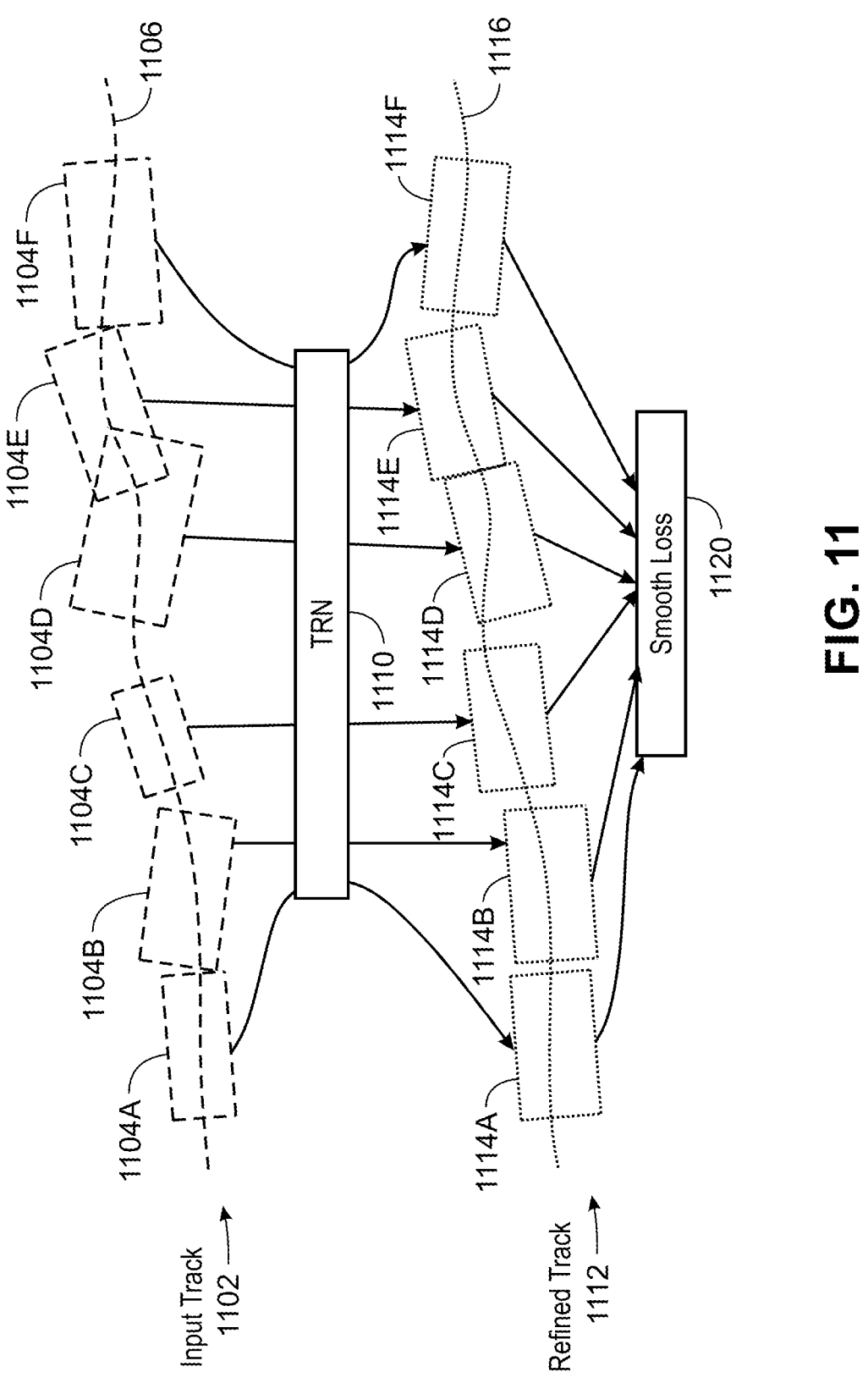
FIG. 11 is an illustration of auxiliary loss function to enhance track movements.

FIG. 11 is an illustration of an auxiliary loss function to enhance prediction smoothness for boxes along a track. In the example of FIG. 11 a track refinement network 1110 is illustrated. The track refinement network 1110 can be implemented (e.g., completely, partially, etc.) using a track refinement network that is the same as or similar to track refinement network 630, described in reference to FIG. 6. In examples, the track refinement network is trained using ground truth labeled center boxes. In embodiments, smoothness losses are introduced during training of the track refinement network to enforce smooth track refinement network center box predictions along the entire track. This prevents the track refinement network from predicting abrupt box changes between nearby track windows, such as big center position jumping, head to tail flipping, and center box size changes.

An auxiliary loss 1120 is used to enhance the box prediction smoothness between nearby boxes along the track. As illustrated, a series of tracked boxes 1104A-1104F creates the input track 1102. The series of tracked boxes are along a time line 1106 according to their corresponding time, where time increases from left to right. Similarly, a series of refined boxes 1114A-1114F creates the refined track 1112. The series of refined boxes 1114A-1114F are along a time line 1116 according to their corresponding time, where time increases from left to right. The series of refined boxes is generated using the series of tracked boxes from the entire input track 1102.

To enforce a prediction of each frame of sensor data for the same track that is smooth, for example, jumps in center box size are penalized. For example, box 1104C is smaller than box 1104D along the input track 1102. For each detected object, the predicted input box size, yaw angle, and velocity are to be consistent along the track. An auxiliary loss 1120 is enforced so the track refinement network learns how to predict a smooth output for boxes along the track.

In examples, the auxiliary loss 1120 for smoothing will enforce a center box size, center position, center box orientation, and velocity. An auxiliary loss 1120 is based on box size. A penalty is applied during training if the track refinement network predicts different object sizes for track windows from the same track. In examples, FIG. 11 shows box 1104C is smaller than the box 1104D. Context of the center boxes along the track are used to refine the input box size, such as the small box 1104C. However, the boxes along the track are also used to refine the box size for the larger box 1104D. If the box size changes for boxes that occur sequentially, a penalty is applied to the final loss function during training of the track refinement network.

In examples, the auxiliary loss 1120 is based on jitter of the box center. As described above, motion is predicted for the track window. For a static track, penalties are imposed on the training loss in response to jitter of a center position. For dynamic tracks, some jumps of center positions are allowed and reflect a center position for dynamic tracks that is smoothly moving. In examples, penalties are imposed on the training loss for large jumps of center position on dynamic tracks. This ensures that the center locations corresponding to the center boxes do not jump along the tracks.

In examples, the auxiliary loss 1120 is based on box orientation. A difference in orientation predictions across the tracks are penalized for track windows from the same static tracks by imposing a higher loss when orientations differ. Particularly, the penalty is higher if the model predicts flipping head and tail orientation for track windows along the same tracks. For static tracks, a higher loss is imposed if boxes from the same track have a prediction of different orientations. The penalty will be higher if the model predicts flipping head and tail orientation, where flipping refers to a 180-degree difference in head or tail position between center boxes. Using the entire tracks, the center boxes with flipped orientations are corrected by applying an auxiliary loss function during training. In examples, the auxiliary training loss 1120 is based on velocity. Large jumps of velocity predictions for track windows from the same track are penalized with a higher loss. This adds some auxiliary loss to enhance the track smoothness.

In some embodiments, track level constraint enforcement is applied to the refined outputs of the track refinement network. Track level constraint enforcement enhances box quality for the entire track. In a first track level constraint enforcement, a shared box size is obtained by applying median filtering to predictions of the whole track. In examples, the median filtering eliminates variations of box size predictions for the same track. For example, using the shared box size means that each box is the same size along the track. The shared box size results in zero difference in box size along the whole track.

In a second track level constraint enforcement, track level static/dynamic status is obtained using the track refinement networks output motion statuses of all track windows. In a third track level constraint enforcement, for additional constraints are applied to static tracks. For example, for a static track zero velocity is used for all boxes. In examples, for a static track, the shared box center is determined as the clustering center of the track refinement networks center predictions for all track windows. In addition to clustering, the shared box center can be determined using the mean, median, and the like. In examples, for a static track, an optimal orientation is shared by the track by applying median filtering to the orientation predictions of all track windows. This removes small jitter associated with the static object.

In some embodiments, the present techniques enable a more comprehensive model of the object by aggregating the observations throughout the entire track, which is then beneficial to the localization accuracy of each individual box along the track. The track refinement network utilizes track level information, including point clouds and trajectory from both past and future outputs from offline perception system, to refine the center boxes. The use of track level information enables the track refinement network to further boost the box quality (box center position, size, orientation, and velocity) significantly. The track refinement network is a lightweight multi-class and multi-task model that executes in conjunction with object detection and perception systems to enhance box quality. It is scalable and efficient to deploy large amounts of driving data. The present techniques are very fast, and are faster than real time. This results in the scalability and efficiency to deploy a large amount of driving data. In examples, faster than real time means that the model can process the data faster than they are generated. For example, a Lidar point cloud is generated at 20 Hz, e.g., 20 frames per second, and the present techniques process approximately 1.5*20 frames in less than a second.

Figure 12:
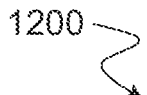
FIG. 12 is a flowchart of a process that enables track refinement networks.
Figure 12:
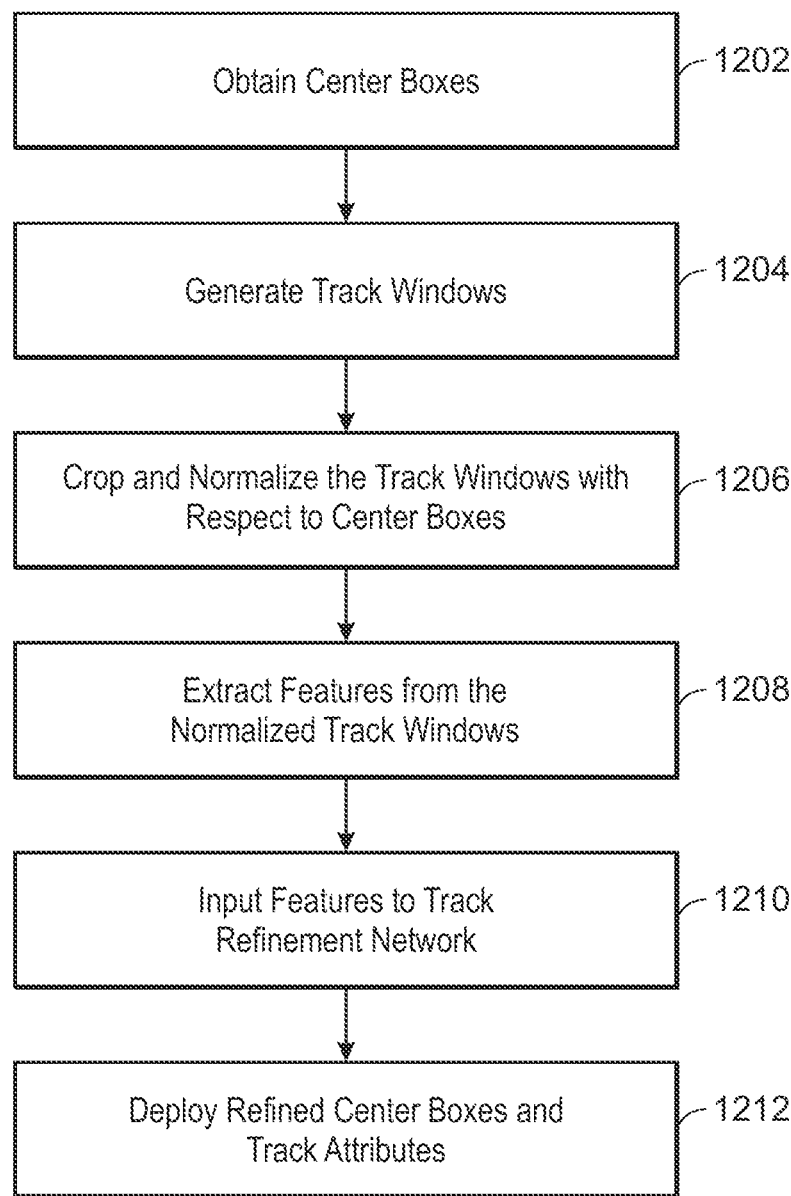

Referring now to FIG. 12, illustrated is a flowchart of a process 1200 for track refinement networks. In some embodiments, one or more of the steps described with respect to process 1200 are performed (e.g., completely, partially, and/or the like) by an autonomous system (e.g., autonomous system 202 of FIG. 2). In some embodiments, the process 1200 is implemented in one or more devices of vehicles 102 (e.g., one or more devices of a system of vehicles 102), at least one device of remote AV system 114, at least one device of fleet management system 116, at least one device of V2I system 118, one or more devices of network 112 (e.g., one or more devices of a system of network 112), one device 300 and/or at least one component of device 300, and/or the AV compute 400 of FIG. 4.

At block 1202, center boxes are obtained. In some examples, center boxes are output of an object detection neural network. In examples, an object detection network outputs a set of predicted 3D bounding boxes for potential objects in the 3D space and corresponding confidence scores for the presence of object class instances within the bounding boxes. In examples, the center box is a center bounding box from a sequence of boxes along a track. A record of driving data is provided as input to generate the sequence of boxes along a track. In embodiments, the track is associated with a detected object within the sequence of boxes, each respective center box comprising a center, a size, and an orientation. In examples, each box of the sequence of boxes is selected as a center box and iteratively processed as described herein.

At block 1204, track windows are generated around respective center boxes, wherein a track window corresponds to a respective center box along the track. At block 1206, the track windows are cropped and normalized to create canvases (e.g., box-aligned canvas with size norm) corresponding to respective center boxes. In examples, the canvases are encoded to obtain features. At block 1208, features are extracted from the cropped and normalized windows (e.g., canvases). In examples the features include point cloud features and trajectory features are described with respect to FIG. 6.

At block 1210, the features are input into a track refinement network, wherein the track refinement network uses features from the entire track window around the center box to output a refined center, a refined size, and a refined orientation of each respective center box. In examples, the track refinement network regresses a residual between the input box obtained from an offline perception system and the actual object box. This residual will then be used to obtain the refined box on top of the input box.

At block 1212, the refined boxes are deployed. In examples, a refined center, size, and orientation of each respective center box is deployed.

According to some non-limiting embodiments or examples, provided is a system including at least one processor and at least one non-transitory storage media. The at least one non-transitory storage media stores instructions that, when executed by the at least one processor, cause the at least one processor to perform operations. The operations include obtaining center boxes from a record of driving data, wherein the center boxes form a sequence of boxes along a track, and the track is associated with a tracked object detected within the sequence of boxes, each respective center box comprising a center, a size, and an orientation. The operations include generating track windows around respective center boxes, wherein a track window corresponds to a respective center box along the track. The operations include cropping and normalizing the track windows with respect to center boxes to enable single refinement model for multiple object classes. The operations include extracting point cloud features and trajectory features from the cropped and normalized track windows. Additionally, the operations include inputting the point cloud features and trajectory features into a track refinement network, wherein the track refinement network uses features from the track to output a refined center, a refined size, and a refined orientation of each respective center box. Further, the operations include deploying the refined center, size, and orientation of each respective center box.

According to some non-limiting embodiments or examples, provided is a method. The method includes obtaining, with at least one processor, center boxes from a record of driving data, wherein the center boxes form a sequence of boxes along a track, and the track is associated with a tracked object detected within the sequence of boxes, each respective center box comprising a center, a size, and an orientation. The method includes generating, with the at least one processor, track windows around respective center boxes, wherein a track window corresponds to a respective center box along the track. Additionally, the method includes cropping and normalizing, with the at least one processor, the track windows with respect to center boxes to enable single refinement model for multiple object classes. The method includes extracting, with the at least one processor, point cloud features and trajectory features from the cropped and normalized track windows. Additionally, the method includes inputting, with the at least one processor, the point cloud features and trajectory features into a track refinement network, wherein the track refinement network uses features from the track to output a refined center, a refined size, and a refined orientation of each respective center box. Further, the method includes deploying, with the at least one processor, the refined center, size, and orientation of each respective center box.

According to some non-limiting embodiments or examples, provided is at least one non-transitory storage media storing instructions that, when executed by at least one processor, cause the at least one processor to perform operations. The operations include obtaining center boxes from a record of driving data, wherein the center boxes form a sequence of boxes along a track, and the track is associated with a tracked object detected within the sequence of boxes, each respective center box comprising a center, a size, and an orientation. The operations include generating track windows around respective center boxes, wherein a track window corresponds to a respective center box along the track. The operations include cropping and normalizing the track windows with respect to center boxes to enable single refinement model for multiple object classes. The operations include extracting point cloud features and trajectory features from the cropped and normalized track windows. Additionally, the operations include inputting the point cloud features and trajectory features into a track refinement network, wherein the track refinement network uses features from the track to output a refined center, a refined size, and a refined orientation of each respective center box. Further, the operations include deploying the refined center, size, and orientation of each respective center box.

Further non-limiting aspects or embodiments are set forth in the following numbered clauses:

Clause 1: A system, comprising: at least one processor, and at least one non-transitory storage media storing instructions that, when executed by the at least one processor, cause the at least one processor to: obtain center boxes from a record of driving data, wherein the center boxes form a sequence of boxes along a track, and the track is associated with a tracked object detected within the sequence of boxes, each respective center box comprising a center, a size, and an orientation; generate track windows around respective center boxes, wherein a track window corresponds to a respective center box along the track; crop and normalize the track windows with respect to center boxes to enable single refinement model for multiple object classes; extract point cloud features and trajectory features from the cropped and normalized track windows; input the point cloud features and trajectory features into a track refinement network, wherein the track refinement network uses features from the track to output a refined center, a refined size, and a refined orientation of each respective center box; and deploy the refined center, size, and orientation of each respective center box.

Clause 2: The system of claim 1, wherein the track refinement network regresses a residual between the respective center box obtained from an offline perception system and a ground truth box.

Clause 3: The system of claim 1 or 2, wherein normalization scales a canvas based on the respective center box.

Clause 4: The system of any of claims 1-3, wherein the track refinement network refines center boxes corresponding to multiple classifications associated with object detection.

Clause 5: The system of any of claims 1-4, wherein the track refinement network comprises shared layers with multiple task heads, and the track refinement network enables execution of multiple tasks corresponding to the multiple task heads.

Clause 6: The system of any of claims 1-5, wherein the track refinement network further outputs track attributes.

Clause 7: The system of any of claims 1-6, wherein the track refinement network is trained using an auxiliary loss function that smooths output of a trained track refinement network.

Clause 8: The system of any of claims 1-7, wherein deploying driving data comprises automatically generating a database of auto labelled training data.

Clause 9: The system of any of claims 1-8, wherein deploying driving data comprises inputting center boxes to an online tracker in online perception.

Clause 10: The system of any of claims 1-9, wherein deploying driving data comprises generating refined boxes to enable image-LiDAR fusion.

Clause 11: The system of any of claims 1-10, comprising enforcing at least one constraint on the refined center, size, and orientation of each respective center box.

Clause 12: A method, comprising: obtaining, with at least one processor, center boxes from a record of driving data, wherein the center boxes form a sequence of boxes along a track, and the track is associated with a tracked object detected within the sequence of boxes, each respective center box comprising a center, a size, and an orientation; generating, with the at least one processor, track windows around respective center boxes, wherein a track window corresponds to a respective center box along the track; cropping and normalizing, with the at least one processor, the track windows with respect to center boxes to enable single refinement model for multiple object classes; extracting, with the at least one processor, point cloud features and trajectory features from the cropped and normalized track windows; inputting, with the at least one processor, the point cloud features and trajectory features into a track refinement network, wherein the track refinement network uses features from the track to output a refined center, a refined size, and a refined orientation of each respective center box; and deploying, with the at least one processor, the refined center, size, and orientation of each respective center box.

Clause 13: The method of claim 12, wherein the track refinement network regresses a residual between the respective center box obtained from an offline perception system and a ground truth box.

Clause 14: The method of claim 12 or 13, wherein normalization scales a canvas based on the respective center box.

Clause 15: The method of any of claims 12-14, wherein the track refinement network refines center boxes corresponding to multiple classifications associated with object detection.

Clause 16: The method of any of claims 12-15, wherein the track refinement network comprises shared layers with multiple task heads, and the track refinement network enables execution of multiple tasks corresponding to the multiple task heads.

Clause 17: At least one non-transitory storage media storing instructions that, when executed by at least one processor, cause the at least one processor to: obtain center boxes from a record of driving data, wherein the center boxes form a sequence of boxes along a track, and the track is associated with a tracked object detected within the sequence of boxes, each respective center box comprising a center, a size, and an orientation; generate track windows around respective center boxes, wherein a track window corresponds to a respective center box along the track; crop and normalize the track windows with respect to center boxes to enable single refinement model for multiple object classes; extract point cloud features and trajectory features from the cropped and normalized track windows; input the point cloud features and trajectory features into a track refinement network, wherein the track refinement network uses features from the track to output a refined center, a refined size, and a refined orientation of each respective center box; and deploy the refined center, size, and orientation of each respective center box.

Clause 18: The at least one non-transitory storage media of claim 17, wherein the track refinement network regresses a residual between the respective center box obtained from an offline perception system and a ground truth box.

Clause 19: The at least one non-transitory storage media of claim 17 or 18, wherein normalization scales a canvas based on the respective center box.

Clause 20: The at least one non-transitory storage media of any of claims 17-19, wherein the track refinement network refines center boxes corresponding to multiple classifications associated with object detection.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:

at least one processor, and at least one non-transitory storage media storing instructions that, when executed by the at least one processor, cause the at least one processor to:

obtain center boxes from a record of driving data, wherein the center boxes form a sequence of boxes along a track, and the track is associated with a tracked object detected within the sequence of boxes, each respective center box comprising a center, a size, and an orientation;

generate track windows around respective center boxes, wherein a track window corresponds to a respective center box along the track;

crop and normalize the track windows with respect to the center boxes;

extract point cloud features and trajectory features from the cropped and normalized track windows;

input the point cloud features and trajectory features into a track refinement network, wherein the track refinement network uses features from the track to output a refined center, a refined size, and a refined orientation of each respective center box; and deploy the refined center, size, and orientation of each respective center box.

2. The system of claim 1, wherein the track refinement network regresses a residual between the respective center box obtained from an offline perception system and a ground truth box.

3. The system of claim 1, wherein normalization scales a canvas based on the respective center box.

4. The system of claim 1, wherein the track refinement network refines the center boxes corresponding to multiple classifications associated with object detection.

5. The system of claim 1, wherein the track refinement network comprises shared layers with multiple task heads, and the track refinement network enables execution of multiple tasks corresponding to the multiple task heads.

6. The system of claim 1, wherein the track refinement network further outputs track attributes.

7. The system of claim 1, wherein the track refinement network is trained using an auxiliary loss function that smooths output of a trained track refinement network.

8. The system of claim 1, wherein deploying driving data comprises automatically generating a database of auto labelled training data.

9. The system of claim 1, wherein deploying driving data comprises inputting center boxes to an online tracker in online perception.

10. The system of claim 1, wherein deploying driving data comprises generating refined boxes to enable image-LiDAR fusion.

11. The system of claim 1, comprising enforcing at least one constraint on the refined center, size, and orientation of each respective center box.

12. A method, comprising:

obtaining, with at least one processor, center boxes from a record of driving data, wherein the center boxes form a sequence of boxes along a track, and the track is associated with a tracked object detected within the sequence of boxes, each respective center box comprising a center, a size, and an orientation;

generating, with the at least one processor, track windows around respective center boxes, wherein a track window corresponds to a respective center box along the track;

cropping and normalizing, with the at least one processor, the track windows with respect to the center boxes;

extracting, with the at least one processor, point cloud features and trajectory features from the cropped and normalized track windows;

inputting, with the at least one processor, the point cloud features and trajectory features into a track refinement network, wherein the track refinement network uses features from the track to output a refined center, a refined size, and a refined orientation of each respective center box; and deploying, with the at least one processor, the refined center, size, and orientation of each respective center box.

13. The method of claim 12, wherein the track refinement network regresses a residual between the respective center box obtained from an offline perception system and a ground truth box.

14. The method of claim 12, wherein normalization scales a canvas based on the respective center box.

15. The method of claim 12, wherein the track refinement network refines the center boxes corresponding to multiple classifications associated with object detection.

16. The method of claim 12, wherein the track refinement network comprises shared layers with multiple task heads, and the track refinement network enables execution of multiple tasks corresponding to the multiple task heads.

17. At least one non-transitory storage media storing instructions that, when executed by at least one processor, cause the at least one processor to:

obtain center boxes from a record of driving data, wherein the center boxes form a sequence of boxes along a track, and the track is associated with a tracked object detected within the sequence of boxes, each respective center box comprising a center, a size, and an orientation;

generate track windows around respective center boxes, wherein a track window corresponds to a respective center box along the track;

crop and normalize the track windows with respect to the center boxes;

extract point cloud features and trajectory features from the cropped and normalized track windows;

input the point cloud features and trajectory features into a track refinement network, wherein the track refinement network uses features from the track to output a refined center, a refined size, and a refined orientation of each respective center box; and deploy the refined center, size, and orientation of each respective center box.

18. The at least one non-transitory storage media of claim 17, wherein the track refinement network regresses a residual between the respective center box obtained from an offline perception system and a ground truth box.

19. The at least one non-transitory storage media of claim 17, wherein normalization scales a canvas based on the respective center box.

20. The at least one non-transitory storage media of claim 17, wherein the track refinement network refines the center boxes corresponding to multiple classifications associated with object detection.

* * * * *